United States Patent
Ebe

(10) Patent No.: US 9,791,857 B2
(45) Date of Patent: Oct. 17, 2017

(54) SYSTEM AND METHOD FOR MONITORING AND ALERTING VEHICLE OCCUPANT TO OPERATING EFFICIENCIES OF AUTONOMOUS DRIVING ASSISTANCE SYSTEMS

(71) Applicant: Toyota Motor Engineering & Manufacturing North America, Inc., Erlanger, KY (US)

(72) Inventor: Kazutoshi Ebe, Novi, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/065,944

(22) Filed: Mar. 10, 2016

(65) Prior Publication Data
US 2017/0261974 A1  Sep. 14, 2017

(51) Int. Cl.
| | |
|---|---|
| *G05D 1/00* | (2006.01) |
| *B60W 30/12* | (2006.01) |
| *B60W 30/14* | (2006.01) |
| *G05D 1/02* | (2006.01) |

(52) U.S. Cl.
CPC ........... *G05D 1/0005* (2013.01); *B60W 30/12* (2013.01); *B60W 30/14* (2013.01); *G05D 1/021* (2013.01)

(58) Field of Classification Search
CPC ...... G05D 1/005; G05D 1/021; G05D 1/0088; B60W 30/12; B60W 30/14; B60W 50/082; B60W 2050/43; G01C 21/32; G01C 21/34; B62D 15/025

USPC .......................... 701/23, 25, 27, 45
See application file for complete search history.

(56) References Cited

U.S. PATENT DOCUMENTS

| | | | | |
|---|---|---|---|---|
| 5,978,715 A | * | 11/1999 | Briffe | G05D 1/0808 244/1 R |
| 6,038,498 A | * | 3/2000 | Briffe | G01C 23/00 244/1 R |
| 6,112,141 A | * | 8/2000 | Briffe | G01C 23/00 345/1.3 |
| 6,275,773 B1 | * | 8/2001 | Lemelson | G01S 19/11 340/436 |
| 6,405,132 B1 | * | 6/2002 | Breed | B60N 2/002 701/117 |
| 8,615,333 B2 | | 12/2013 | Giebel et al. | |
| 2013/0253756 A1 | | 9/2013 | Matsuno | |
| 2014/0075356 A1 | | 3/2014 | Gray et al. | |

(Continued)

FOREIGN PATENT DOCUMENTS

JP      2007196714 A      8/2007

*Primary Examiner* — McDieunel Marc
(74) *Attorney, Agent, or Firm* — Christopher G. Darrow; Darrow Mustafa PC

(57) ABSTRACT

A computing device for a vehicle is provided. The computing device includes one or more processors for controlling operation of the computing device, and a memory for storing data and program instructions usable by the one or more processors, wherein the one or more processors are configured to execute instructions stored in the memory to receive sensor data relating to operation of an autonomous driving assistance system, process the received sensor data to derive a value for an assistance system data quality parameter, compare the quality parameter value to a reference, and generate a notification including a result of the comparison.

20 Claims, 7 Drawing Sheets

(56) References Cited

U.S. PATENT DOCUMENTS

| | | | | |
|---|---|---|---|---|
| 2015/0077272 | A1* | 3/2015 | Pisz | B60K 37/06 340/905 |
| 2016/0019767 | A1* | 1/2016 | Ebe | G08B 21/02 340/425.5 |
| 2016/0042627 | A1* | 2/2016 | Foley | B60Q 9/00 340/576 |
| 2016/0055750 | A1* | 2/2016 | Linder | G08G 1/16 340/905 |
| 2016/0170414 | A1* | 6/2016 | Chen | G05D 1/0088 701/27 |
| 2016/0375912 | A1* | 12/2016 | Christensen | B60W 50/0097 701/25 |
| 2016/0378112 | A1* | 12/2016 | Ljubuncic | G05D 1/0055 701/45 |

* cited by examiner

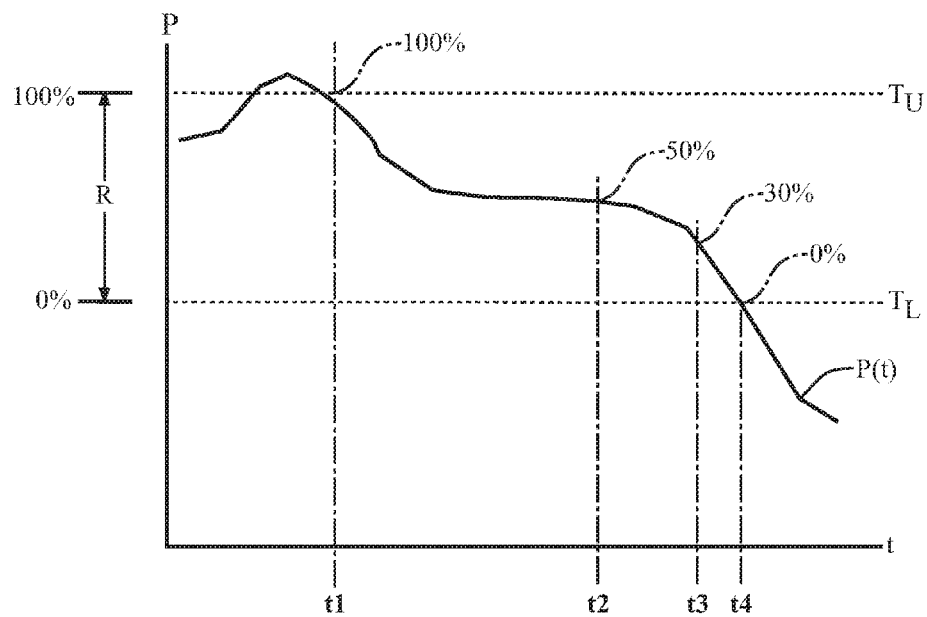

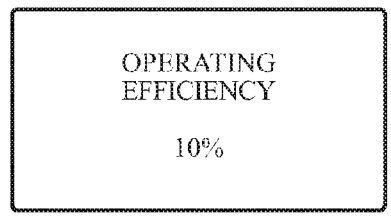
FIG. 4C
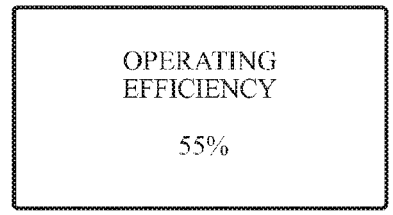
FIG. 4D
FIG. 5A
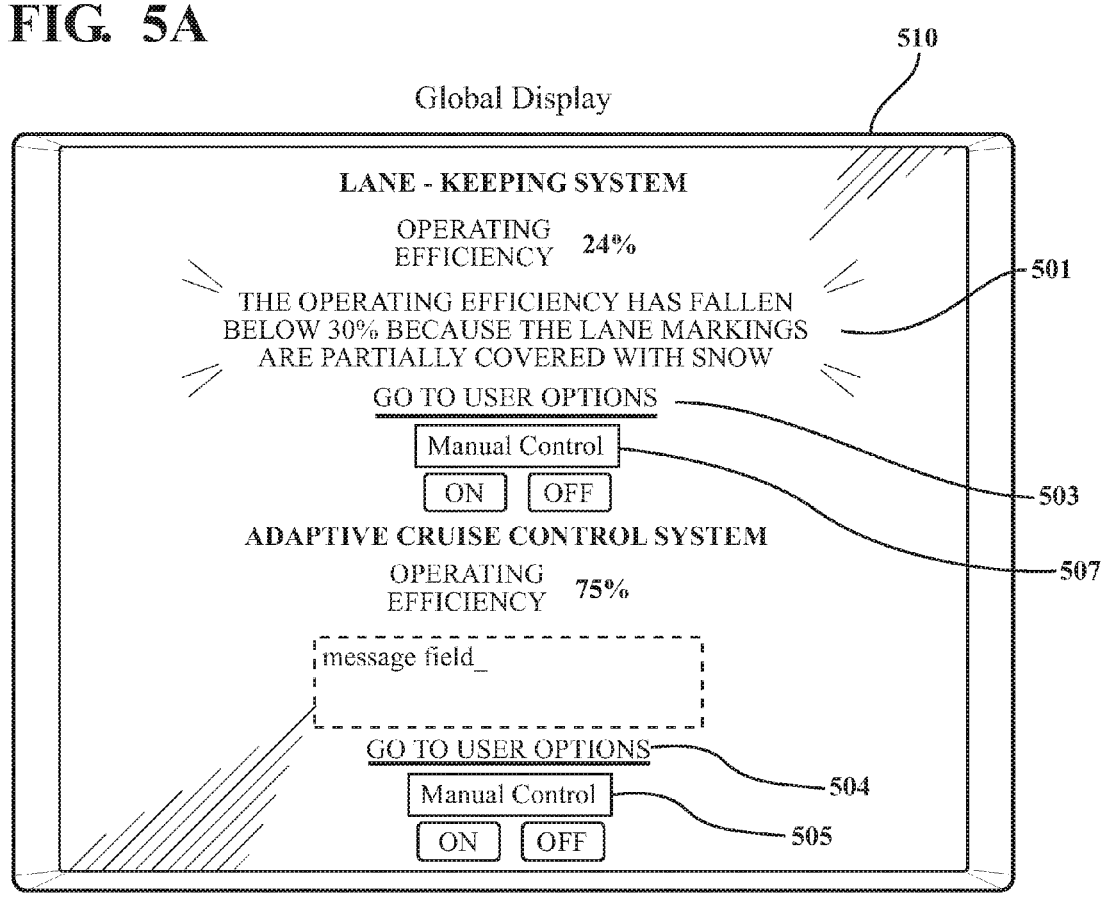

SYSTEM AND METHOD FOR MONITORING AND ALERTING VEHICLE OCCUPANT TO OPERATING EFFICIENCIES OF AUTONOMOUS DRIVING ASSISTANCE SYSTEMS

TECHNICAL FIELD

The present disclosure relates to autonomous driving assistance systems, and, more particularly, to a system and method of monitoring and alerting a vehicle occupant to levels and changes in the operating efficiencies of various autonomous driving assistance systems.

BACKGROUND

Autonomous driving assistance systems (such as adaptive cruise control and lane-keeping systems, for example) do not perform optimally at all times. The operating efficiencies of such systems may vary with such factors as the environmental conditions under which the systems are operating, system component malfunctions, etc. Users unfamiliar with such systems are not always aware when the system is not operating at full efficiency, or why the system is not operating at full efficiency, or what factors affect operational efficiency of the system. Thus, when a system fails unexpectedly or operates, but fails to operate as expected, a vehicle user may lose confidence in the system. It would be beneficial to have a method and system which constantly informs the user of changes in the operating efficiency of autonomous driving assistance systems, and also informs the user as to why a system may not be functioning at full efficiency.

SUMMARY OF THE INVENTION

In one aspect of the embodiments described herein, a computing device, for a vehicle is provided. The computing device includes one or more processors for controlling operation of the computing device, and a memory for storing data and program instructions usable by the one or more processors, wherein the one or more processors are configured to execute instructions stored in the memory to receive sensor data relating to operation of an autonomous driving assistance system, process the received sensor data to derive a value for an assistance system data quality parameter, compare the quality parameter value to a reference, and generate a notification including a result of the comparison.

In another aspect of the embodiments described herein, a method of monitoring the operating efficiency of an autonomous driving assistance system is provided. The method includes steps of receiving sensor data relating to operation of the system, processing the received sensor data to derive a value for a data quality parameter, comparing the quality parameter value to a reference, and generating a notification including a result of the comparison.

BRIEF DESCRIPTION OF THE DRAWINGS

The accompanying drawings, which are incorporated in and constitute a part of this specification, illustrate embodiments described herein and together with the description serve to explain principles of embodiments described herein.

FIG. 3A is a graph demonstrating one method of calculating a reference for a sensor data quality parameter in accordance with the embodiments described herein, and measurement of the quality parameter for data from a single sensor of a driver assistance system over time during operation of the vehicle.

FIGS. 3B-3E show examples of portions of screen displays which provide a notification to a vehicle occupant of the changes in system operating efficiency in terms of changes in the values of the quality parameter P plotted in FIG. 3A.

FIG. 4C is an example of a portion of a display showing an estimated operational efficiency of the driver assistance system represented in FIGS. 4A and 4B at a first point in time.

FIG. 4D is an example of a portion of a display showing an estimated operational efficiency of the driver assistance system represented in FIGS. 4A and 4B at a second point in time later than the first point in time.

FIG. 5A shows a schematic view of an example of a touch screen interface configured to display to a user the latest estimates of operating efficiency for the various autonomous driver assistance systems.

DETAILED DESCRIPTION

The embodiments described herein relate to a system and method of monitoring and alerting a vehicle occupant to changes in the operating efficiencies of one or more autonomous driving assistance systems. The driving assistance system operating efficiency is expressed in terms of the quality or reliability of data received from one or more sensors which provide data used to operate the driving assistance system. A reference range is established for the quality of a type of data deemed to be representative of system operating efficiency. The reference range is established using samples of "best-case" data and "worst-case" data. A quantity of data gathered during operation of the driving assistance system is compared on a continuous basis with the reference range to determine a value expressing where the data falls within the range. This value is expressed as an operating efficiency of the system. A notification including this operating efficiency is provided to a vehicle occupant. The notification is constantly update based on the latest sensor data. If the estimated operating efficiency reaches or falls below a certain predetermined threshold for longer than a predetermined time period, the notification may include a reason for the drop in operating efficiency. By displaying the reason for a relative drop in system operating efficiency, a user learns to associate changes in various external operating conditions with their associated effects on system efficiency. This educates the user as to the limitations of the associated systems and increases user familiarity with (and confidence in) the systems. In addition, by enabling user selection of various system parameters as described below, increased interaction and familiarity with the driving assistance systems is encouraged.

As will be appreciated by one skilled in the pertinent the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
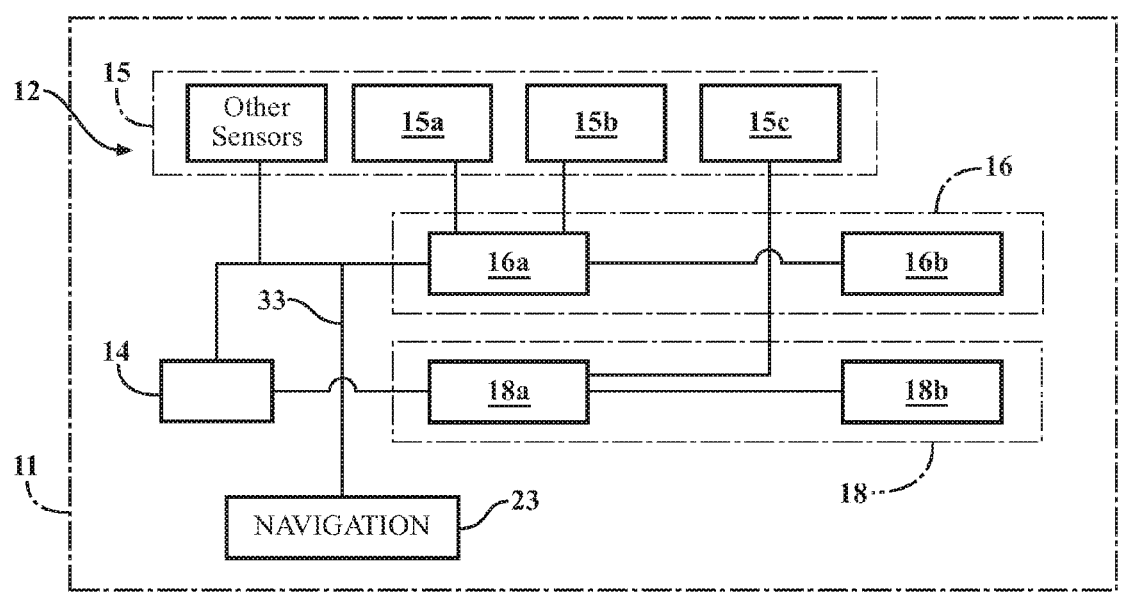
FIG. 1 is shows a schematic arrangement of a portion of a vehicle control system configured for at least partially autonomous control of a vehicle, for the purposes described herein.

FIG. 1 is shows a schematic arrangement of a portion of a vehicle control system 12 configured for at least partially autonomous control of a vehicle 11, for the purposes described herein. The vehicle control system 12 is also configured to enable the vehicle 11 to be driven totally under manual control if desired by a user, in an emergency, or in the event that one or more autonomous systems become impaired or unavailable, for example. The control system 12 includes a computing device 14 and a sensor array 15 in operative communication with the computing device. A plurality of control autonomous driver assistance systems 16, 18, 23 is in operative communication with the sensor array 15 and computing device 14. The embodiment shown in FIG. 1 includes two driver assistance systems. For example, system 16 could be an autonomous lane-keeping or lane centering system, and system 18 could be an adaptive cruise control system (ACC).

A navigation module 23 may be, for example, a known navigation system receiver (for example, a GPS receiver) configured to receive vehicle location information from a navigation system, such as a GPS system (not shown). However, navigation module 23 may have any alternative form or configuration suitable for the purposes described herein. Module 23 is also configured to operatively communicate with computing device 14 for providing vehicle navigational information for the purposes described herein. Computing device may incorporate a suitable navigational interface 123 if needed to facilitate operative communication with navigation module 23. Module 23 may have GPS maps or other navigational information stored thereon.

Each of autonomous driver assistance systems 16 and 18 may include a specialized controller which is in operative communication with associated actuatable elements operable responsive to control commands received from the controller. For example, a driver assistance system such as an adaptive cruise control system 18 may include an adaptive cruise control controller 18a and various actuatable elements (throttle, braking, etc.) 18b necessary for executing the functions of the ACC braking control responsive to control commands received from the braking controller. A driver assistance system such as a lane-keeping system 16 includes a lane-keeping system controller 16a in operative communication with associated actuatable components 16b (for example, steering, etc.) necessary for executing lane-keeping control commands.

Examples of other driver assistance systems and/or capabilities which may be incorporated into the vehicle control system include electronic stability control, forward collision warning, lane merge assist, and blind spot monitoring. Additional controls, systems and/or capabilities may be provided if needed to perform the functions described herein, depending on the design of a particular vehicle. The vehicle embodiments described herein are assumed to have sufficient autonomous systems and/or capabilities to execute the various operations described herein, and to provide the user notifications and control transfers (from manual to autonomous operation, and vice versa) described herein.

The control system 12 may be configured so that the various specialized controllers, sensors and other elements of the system can communicate with each other using a controller area network (CAN) bus 33 (FIG. 1) or the like. Via the CAN bus and/or other wired or wireless mechanisms, the computing device 14 may transmit messages to various devices in the vehicle and/or receive messages from the various devices, e.g., controllers, actuators, sensors, etc.

Figure 2:
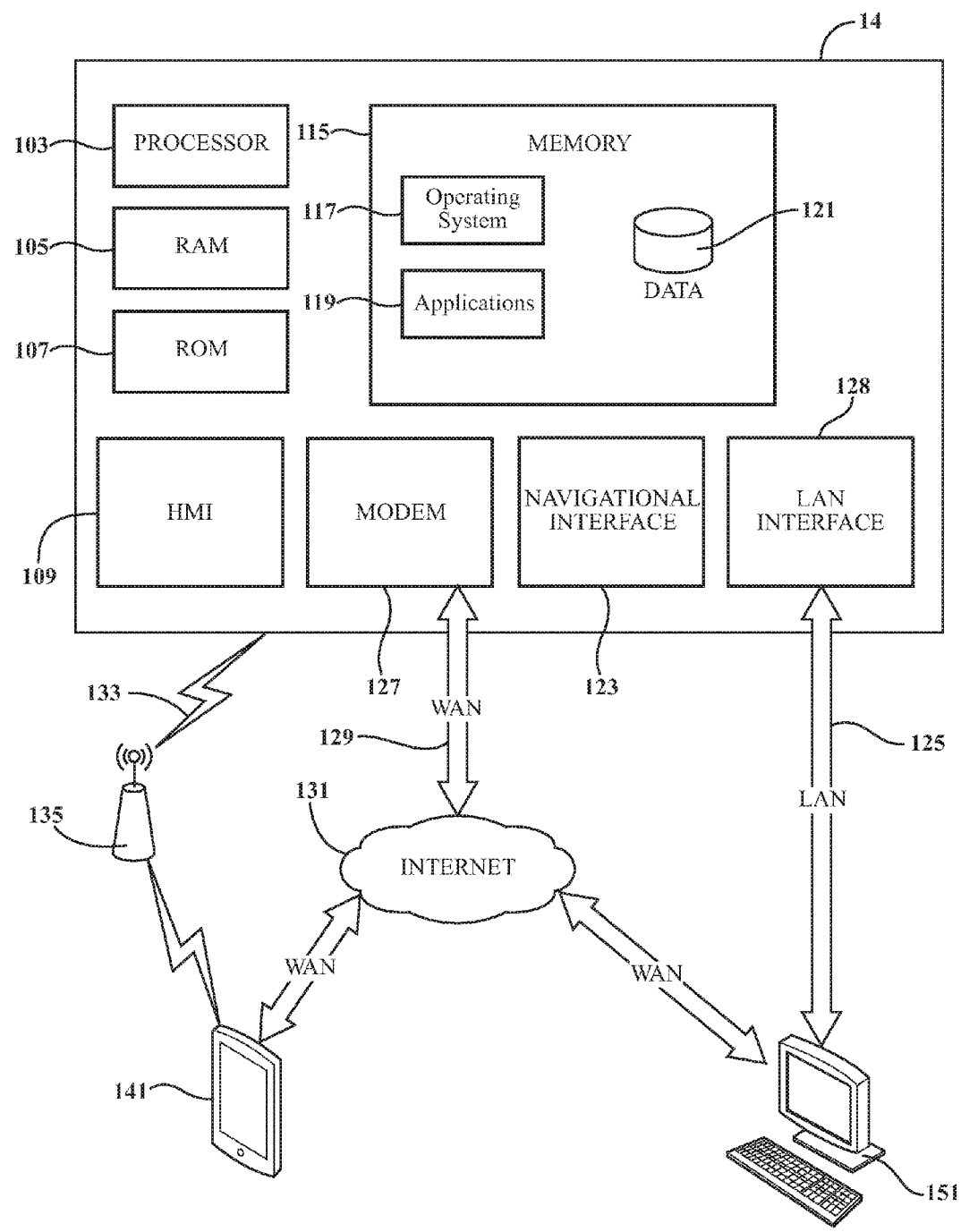
FIG. 2 is a block diagram of a computing device in the vehicle control system of FIG. 1.

FIG. 2 illustrates a block diagram of a computing device 14 in the vehicle control system 12 that may be used according to one or more illustrative embodiments of the disclosure. The computing device 14 may have a processor 103 for controlling overall operation of the device 14 and its associated components, including RAM 105, ROM 107, an input/output module or human-machine interface (HMI) 109, and computer-readable storage or memory 115. The computing device 14, along with one or more additional computing devices (e.g., specialized controllers 16a, 18a, 23, terminal 141) and other devices may correspond to any of multiple systems or devices configured as described herein for functions such as autonomously (i.e., without vehicle operator or occupant input) operating the entire vehicle or specific portions of the vehicle. Computing device 14 may be embodied in a vehicle controller, for example.

Computing device 14 may be configured to serve as an autonomous driving module, coordinating operations of the specialized controllers 16a, 18a, 23 and controlling (or assisting in coordinated control of) all autonomous driving operations, including steering, braking, turn signaling, etc. Computing device 14 may also be configured to operate the various vehicle systems and components so as to execute various autonomous commands or maneuvers (for example, vehicle starts and stops, lane changes, etc.) needed to execute the maneuvers and/or operations described herein. Computing device 14 may also be configured to operatively communicate with navigation module 23 as previously described.

Computing device 14 may also be configured to receive and store information from the sensor array 15, from any of specialized control modules 16a, 18a, 23 and from any other vehicle components pertaining to operation of the automated vehicle control systems. The computing device 14 may also be configured to receive and store the information so that all of the information is time-correlated and may be processed for diagnostic or analysis purposes. The computing device 14 is also configured to perform the various operations described herein, including receiving data gathered by various sensors, and processing, evaluating, comparing, storing and presenting or displaying the data as described herein.

A computer-readable storage or memory 115 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Input/Output (I/O) module or HMI 109 may include a microphone, keypad, touch screen, and/or stylus through which a user of the computing device 14 may provide input, and may also include one or more of a speaker for providing audio output and a video display device for providing textual, audiovisual and/or graphical output. Software may be stored within memory 115 and/or storage to provide instructions to processor 103 for enabling device 14 to perform various functions. For example, memory 115 may store software used by the device 14, such as an operating system 117, application programs 119, and an associated internal database 121. Processor 103 and its associated components may allow the computing device 14 to execute a series of computer-readable instructions to receive occupant feedback and to perform other interface-related functions as described herein. The interface 109 may incorporate and implement a voice recognition routine, allowing the control system to present information and selection options through a speaker, and to receive driver input through a microphone.

The visual and voice interfaces described herein may be embodied in any one of a variety of computing devices including a processor and a memory, as well as communication capabilities. For example, the interfaces may operate on a portable computer, tablet computer, a smart phone, a smart watch, etc. that includes capabilities for wireless communications using IEEE 802.11, Bluetooth, and/or cellular communications protocols. Further, the device implementing the interface may use such communication capabilities to communicate with a vehicle computing device 14. A device could communicate with a vehicle computer 14 via other mechanisms such as a network in the vehicle, a known protocol such as Bluetooth, etc. Accordingly, the user device may be used to carry out certain operations herein ascribed to a data collector (e.g., voice recognition functions, cameras, global positioning system (GPS) functions, etc.), and the user device could be used to provide data to the computing device 14, and may be used to provide a human machine interface (HMI) to the computing device 14. Thus, the visual and voice interfaces described herein may be embodied in one or more application programs in a cellular phone, PDA, or other wireless device, for example. These embodiments of the interfaces may enable communication with the vehicle control system without the need installation of a touch screen or audio equipment in the vehicle interior. In another embodiment, the wireless device may communicate with the vehicle control system via a suitable docking station or port residing in the vehicle interior.

The various computing devices may operate in a networked environment supporting connections to one or more remote computers, such as terminals or wireless device(s) 141 and/or 151. Computing device 14 and any other computing devices and related devices or terminals 141 and 151, may include devices installed in vehicles, mobile devices that may travel within vehicles, or devices outside of vehicles that are configured to receive and process vehicle and driving data. Thus, the computing device 14 and related devices or terminals 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, suitably-configured wearable devices (such as a watchband) and the like)(not shown), and may include some or all of the elements described above with respect to the computing device 14. In addition, any of these computing device embodiments may include a haptic interface or may be configured to provide haptic feedback to a vehicle occupant to inform the occupant of a change in automation status, an active or pending alert, or any other status or condition which should be communicated to the occupant. The network connections depicted in FIG. 2 may include a local area network (LAN) 125, a wide area network (WAN) 129 and a wireless telecommunications network 133, but may also include other networks. When used in a LAN networking environment, the computing device 151 may be connected to the LAN 125 through a network interface or adapter 128. When used in a WAN networking environment, the device 14 may include a modem 127 or other means for establishing communications over the WAN 129, such as network 131 (e.g., the Internet). When used in a wireless telecommunications network 133, the device 14 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

In a particular embodiment, one or more of the computing devices described herein is configured to enable a user to interface (either via LAN 125 or wirelessly) with instructional software designed to familiarize the user with operation of the efficiency monitoring system embodiments and features described herein. The instructional programs may be configured to simulate operation of an actual vehicle and various situations that may occur during operation of the vehicle, and to receive and provide feedback to user inputs responsive to the simulated conditions. The instructional materials may also incorporate various other capabilities. In one embodiment, the instructional software may reside onboard the vehicle (for example, on computing device 14) and may be accessible through a wired or wireless interface. Alternatively, the instructional software may reside on a remote server (for example, as part of a cloud-accessible application).

It will be appreciated that the network connections shown are illustrative and other means of establishing a communications link between the various computing devices may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Control system 12 includes an array 15 of vehicle sensors designed to monitor various vehicle operational parameters and environmental conditions external to the vehicle. FIG. 1 does not necessarily show all of the sensors providing input to a given driving assistance system. Rather, FIG. 1 shows representative examples of vehicle sensors for detecting environmental and operational conditions exterior to the vehicle, for example road conditions, weather conditions, the distance from the vehicle to another vehicle driving in front of the vehicle, etc. These conditions affect the quality of the data gathered by the sensors and processed to generate control commands to the driver assistance systems associated with the sensors.

In a known manner, the vehicle sensors shown in FIG. 1 and also other sensors not shown in FIG. 1 may provide data used by the various controllers in formulating and executing suitable control commands in the autonomous driver assistance systems 16, 18. For example, data from inertial sensors, wheel speed sensors, and steering angle sensors (not shown in FIG. 1) may be processed in formulating and executing a command in steering system 16 to turn the vehicle. Examples (not shown) of sensors that may be incorporated into a semi-autonomous or fully autonomous vehicle sensor array include radar and lidar systems, laser scanners, vision/camera systems, GPS systems, various inertial sensors such as gyroscopes and accelerometers, vehicle wheel speed sensors, road condition sensors, suspension height sensors, steering angle sensors, steering torque sensors, brake pressure sensors, accelerator or pedal position sensor, and tire pressure sensors.

For example, the sensor array 15 may include various types of sensors in communication with other control system components, for providing feedback on operations of the vehicle. For example, sensors 15 may detect and store data corresponding to the vehicle's location (e.g., GPS coordinates), speed and direction, rates of acceleration or braking, and specific instances of sudden acceleration, braking, and swerving. Sensors 15 also may detect and store data received from the vehicle's internal systems, relating to such factors as impact to the body of the vehicle, air bag deployment, headlights usage, brake light operation, door opening and closing, door locking and unlocking, hazard lights usage, windshield wiper usage, horn usage, turn signal usage, seat belt usage, phone and radio usage within the vehicle, maintenance performed on the vehicle, and other data collected by the vehicle's various computing devices.

Additional ones of sensors 15 may detect and store information relating to external driving conditions, for example, external temperature, rain, snow, light levels, and sun position for driver visibility. For example, external cameras and proximity sensors, radar, lidar and other types of sensors may detect other nearby vehicles, traffic levels, road conditions, traffic obstructions, animals, cyclists, pedestrians, and other conditions that may factor into a driving event data analysis. Sensors 15 also may detect and store data relating to moving violations and the observance of traffic signals and signs by the vehicle. Additional ones of sensors 15 may detect and store data relating to the maintenance of the vehicle, such as the engine status, oil level, engine coolant temperature, odometer reading, the level of fuel in the fuel tank, engine revolutions per minute (RPMs), and/or tire pressure.

Vehicle sensors 15 also may include cameras and/or proximity sensors capable of recording additional conditions inside or outside of the vehicle. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensors 15 also may be configured to collect data a driver's movements or the condition of a driver. For example, vehicle may include sensors that monitor a driver's movements, such as the driver's eye position and/or head position, etc. Additional ones of sensors 15 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer.

In particular embodiments, sensors 15 include a camera or vision system 15a configured to capture images of road and street signs (including overhead signs), traffic signs, speed limit signs, signs indicating an upcoming toll facility and/or other signs present along the vehicle route, in front of and to the sides of the vehicle. In a manner known in the art, the vision system 15a may supply the imaged areas as a video signal (e.g., as bit map data) to computing device 14. Computing device 14 may incorporate therein optical character recognition software which enables the computing device 14 to convert the supplied video signals into (and/or associate the received image with) a recognized road sign by utilizing various information within the supplied video signal including the text sign data (i.e., the words printed on the sign), the sign image shape, and the sign image color(s), in a manner known in the art.

The computing device 14 may be configured to access (either in memory 115 or through navigation module 23) vehicle location information base to determine the current location of the vehicle. The vehicle location information may include information pertaining to road names and numbers, road vectors, highway exits, town/country/state names, as well as any other data that may be useful navigating the vehicle. Using the optical character recognition software, the recognized road sign may be associated with a known road number, road name, town name, a road direction (e.g., north, south, east or west), a mile marker, etc.

Certain of vehicle sensors 15 also may collect information regarding the driver's route choice, whether the driver follows a given route, and to classify the type of trip (e.g. commute, errand, new route, etc.). In certain embodiments, sensors and/or cameras may determine when and how often the vehicle stays in a single lane or stray into other lanes. A Global Positioning System (GPS), locational sensors positioned inside the vehicle, and/or locational sensors or devices external to the vehicle may be used determine the route, lane position, and other vehicle position/location data.

The data collected by vehicle sensors 15 may be stored and/or analyzed within the vehicle and/or may be transmitted to one or more external devices. For example, the sensor data may be transmitted via telematics devices to one or more remote computing devices, such as a mobile device or laptop computer. Any data collected by vehicle sensors 15 may also be transmitted to any vehicle system or component requiring or utilizing the data for the purposes described herein. For example, the data collected by vehicle sensors 15 may be transmitted to vehicle controller 14, to one or more specialized component controllers, or to the HMI 109.

Particular vehicle sensors may be incorporated into one of the specialized vehicle controllers 16a, 18a. Particular vehicle sensors may also configured to provide inputs to more than one driver assistance system. For example, in a vehicle incorporating both automated steering and braking control, various road condition sensors may provide data to both the steering system controller and the braking controller to enable these controllers to process the road condition information in accordance with stored processor-executable instructions, and to formulate appropriate control commands to the steering system and braking system. In addition, the various specialized controllers 16a, 18a in the vehicle may operate effectively as sensors or as data collectors to provide data or inputs via the CAN bus 33 enabling communication between the elements of the control system. Other vehicle modules, systems and/or components may also be networked via the bus 33.

FIG. 1 shows just a few examples of automated driver assistance systems 16, 18, 23 which may be incorporated into a vehicle. A particular vehicle may incorporate one or more of these systems or other systems (not shown) in addition to one or more of the systems shown.

If a controller requires an integrated or composite signal formed from outputs of multiple individual sensors, a known sensor fusion means (incorporating, for example, a suitable Kalman filter) may be introduced between the sensor array (or the pertinent sensor(s)) and the pertinent controller or incorporated into the controller. Also, if a sensor output signal requires pre-processing prior to use by a controller, a known pre-processing means (for example, an A/D converter) may be introduced between the sensor array (or the pertinent sensor(s)) and the pertinent controller or incorporated into the controller. Similarly, if operation of any actuatable sub-system components will require processing of a control signal received from a controller, a known processing means (for example, an A/D converter) may be introduced between the controller and the actuatable components or incorporated into the controller.

Embodiments described herein are directed to evaluating and displaying to a user an estimated current operating efficiency of at least one autonomous vehicle driving assistance system. The estimated current operating efficiency of the system may be calculated based on a level of confidence or reliability in the sensor data being processed and used to control the associated system.

In the embodiments described herein, it is assumed that the pertinent vehicle sensors are functioning properly internally. Thus, variations in the quality of the data received from the sensor array 15 (and the associated reliability of the data) are assumed to be due to corresponding variations in the environmental conditions in which the sensors are operating.

As a basis for comparison with sensor data gathered during normal vehicle operations, lower and an upper references are established by processing associated reference data samples. In one embodiment, the reference levels for data confidence are established using one or more quantifiable parameters relating to the data gathered by a sensor. The parameter(s) used may be indicative of the quality of the data received from the pertinent sensor. For example, if the pertinent sensor is a camera providing data used for controlling a lane keeping system, a measure of the quality of the image data gathered by the camera may be measured. The contrast, signal strength, and/or pixel quality of the sample image may be determined and evaluated. The parameter(s) chosen for use as quality parameters may depend on such factors as the type of data being examined, the type of sensor gathering the data, which parameter is deemed to best represent the data quality for a given application, and other pertinent factors.

If multiple parameters are used to generate a confidence reference level, the values of the parameters may be weighted and combined to form a composite numerical value. For example, in a camera, if both contrast and pixel quality are to be used as quality parameters, the value of each parameter may be assigned a certain weight and the parameters may be combined to generate a confidence level in the sample of sensor data evaluated for quality. The parameter values used may be integrated or otherwise combined in a fusion process (for example, in a suitable Kalman filter) to provide a composite sensor parameter usable for assigning a threshold level for the sensor data.

In one aspect, the chosen quality parameters for a given type of data may be evaluated and used to generate a minimum confidence level for the type of sensor data being examined. A minimum allowable quality of data received from the sensor may define (or may be used in calculating) the minimum confidence level $T_L$ for that type of sensor data. The minimum allowable data quality may reflect the "worst-case" data quality for which the sensor will be deemed to reliably operate. This may be used to define a lowermost threshold or reference for comparison with data gathered by the sensor during normal operation of the driving assistance system.

For example, where a camera is used as the sensor, an image taken by the camera may be selected that reflects the "worst-case" data quality for which the sensor will operate (i.e., the selected image may have characteristics which produce the lowest signal quality permissible to guarantee that the associated sensor is operating reliably). In a camera used to provide data for a lane-keeping or lane-centering system, the image quality or signal strength may be affected by such factors as the quality of lane markings, road surface conditions and weather conditions. Thus, an image selected to aid in defining the "worst-case" data quality may show a road surface having poorly defined lane markings and difficult road conditions such as dirt, road salt, tar strips, patches, or ghost lines. An image selected to aid in defining the "worst-case" data quality may also (or alternatively) show a road surface partially obscured by snow, rain, or fog. These conditions can make it difficult for the camera to detect the lane and road markings, in order to enable the lane keeping system to perform its function. Thus, the "worst-case" data quality sample may be evaluated and a numerical value assigned to the quality parameter for that data sample.

Similarly, the chosen quality parameter(s) for a given type of data from a given sensor may be evaluated and used to generate a maximum confidence reference level $T_U$ for the type of sensor data being examined. For example, for a camera, an image may be selected that reflects ideal conditions for lane marker detection and which provides a correspondingly high signal strength or image quality. Thus, an image selected to aid in defining the "best-case" data quality may show a road surface having well-defined lane markings and clean road conditions, in dry and clear weather conditions. This image may be used to define an uppermost reference $T_U$ level for comparison with images gathered by the camera during normal operation of the lane keeping system. Thus, the "best-case" data quality sample may be evaluated and a numerical value assigned to the quality parameter for that data sample.

Referring to FIG. 3A, when the chosen sensor quality parameter has been analyzed and quantified for each given reference sample (i.e., the "worst-case" and "best-case"

sensor readings), the parameter value for the "worst-case" scenario may be used to calculate or define the minimum or threshold confidence level $T_L$ for the data received from the sensor. Also, the quality parameter value for the "best-case" scenario may be used to calculate or define a maximum confidence level $T_U$ for the data received from the sensor. This enables a numerical range R to be defined between the minimum and maximum confidence levels $T_U$ and $T_L$. In one embodiment, the autonomous system operational efficiency is expressed as a percentage of the numerical range R. The minimum and maximum confidence levels $T_U$ and $T_L$ may be stored in a memory for reference or comparison purposes.

Because the operating efficiency of the autonomous system is directly related to (and dependent upon) the quality of the sensor data processed to operate the system, the values within the quality parameter numerical ranges of the sensors may be used to derive a parameter representing to a user an operational efficiency of the autonomous system. In a particular embodiment, a single sensor supplies the data processed and used to control the autonomous system during vehicle operation (for example, in the manner shown in system 18 of FIG. 1). Then, the operational efficiency of the autonomous system may be expressed as the confidence level in the data gathered by the single sensor during system operation.

For example, in FIG. 3A, the graph shows the variation over time in the quality parameter P of data gathered by a particular sensor during operation of the vehicle. As the autonomous system is operated, data is gathered by the sensor. Samples of the data are processed as previously described on an ongoing basis to assign a numerical value to the quality parameter P selected to represent the quality of each data sample.

After the quality parameter value is assigned a numerical value, this value is compared with the reference range R to see where it falls in relation to the best-case data ($T_U$, 100%) and worst-case data ($T_L$, 0%). For example, if the range of values for the quality parameter is 0-10 (with 10 being the highest quality), then data with a value of 6 would correlate with an operating efficiency of 60%. An exemplary history of the calculated efficiency percentages is plotted as line P(t) in FIG. 3A. These percentages are also displayed to a user as described herein.

The size of the data sample processed may depend on such factors as computer processing capability, data acquisition rate, vehicle speed, and any other pertinent factors. For example, for camera image data, a single frame at a time may be processed, or samples may be extracted from the data stream at every 10, 100, or 1000 frames. Alternatively, data may be sampled for analysis and comparison with the references at a predetermined rate, for example every one sample every 100 milliseconds. In one example, the numerical values of P as a function of time t are plotted as the line P(t) shown in FIG. 3A. In the example shown, the value of the quality parameter P for the data measured at time t1 is close to 100% (i.e., highest data quality). Thus, in correlation with the estimated data quality, the associated autonomous system is deemed to be operating at close to 100% efficiency, as shown in FIG. 3B.

Most data of sufficient quality to enable operation of the autonomous system will have a confidence level between the 0% and 100% reference values previously calculated. For a lane keeping system camera, for example, a relatively high confidence level in the sensor readings may derive from a stretch of road having well defined lane markings and good road conditions, for example. A lower confidence level in the sensor readings may derive from a stretch have poorly defined lane markings and difficult road conditions such as tar strips, patches, or ghost lines to name a few examples. Similarly, for a radar sensor in an adaptive cruise control, the data quality may be affected by such factors as the size and bearing of the leading vehicle, environmental conditions such as water droplets and dust particles, and other factors. Thus, a relatively high confidence level in the sensor readings may derive from data gathered in a dry, dust-free environment. A lower confidence level in the sensor readings may derive from data gathered in rainy conditions or along a dusty road surface.

Referring again to FIG. 3A, as the autonomous system continues to operate, at t2, the estimated quality of the data (as reflected in the value of parameter P) has fallen to 50%. Thus, at this point, the autonomous system is deemed to be operating at 50% efficiency. Below a certain predetermined confidence level threshold, it may be determined that the autonomous system will not operate reliably. With data having a confidence level above the predetermined confidence level threshold $T_L$ (0%), it is assumed that the autonomous system will operate reliably. At time t4, it is seen that the estimated operating efficiency of the autonomous system has fallen to 0%. At this point (or at any point prior to this), the user may elect to deactivate the autonomous system and to resume manual control of the vehicle according to requirements prevailing when the autonomous system in question is deactivated. Prior to deactivation, the driver may be advantageously prompted by a warning signal to assume manual steering control (known as a "takeover request").

The parameters values at times t1, t2 and t3 are described here as representative samples of the values indicated in the line P1. Any desired number of data samples may be evaluated, based on processor and data acquisition capabilities. The data is gathered and processed continuously during operation of the associated autonomous system, so a that a constant, up-do-date estimate of the autonomous system operating efficiency may be presented to a user for evaluation and decision making. Thus, in FIG. 3, between times t3 and t4, any desired number of calculated or measured values of P may be presented to the user to show the gradual drop in estimated data quality from t3 to t4.

FIGS. 3B-3E show examples of portions of screen displays which provide a notification to a vehicle occupant of the changes in system operating efficiency in terms of changes in the values of quality parameter P (as indicated in FIG. 3A). FIG. 3B shows the system operating efficiency at time t1, FIG. 3C at time t2, FIG. 3D at time t3, and FIG. 3E at time t4 of FIG. 3A.

Figure 4A:
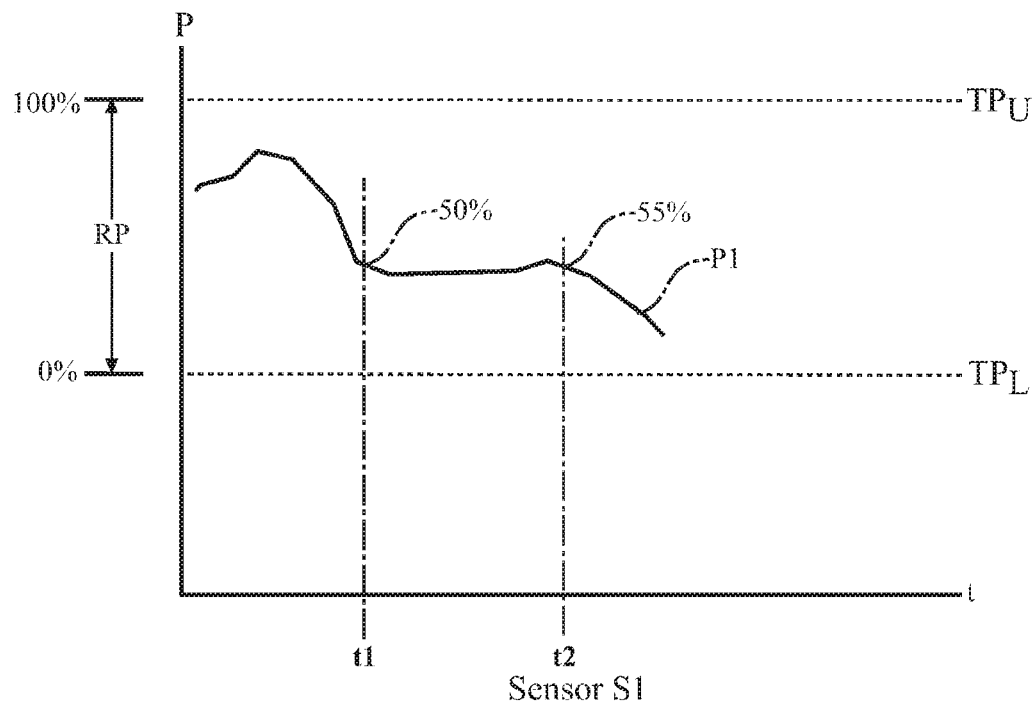
FIG. 4A is a graph demonstrating one method of calculating a reference for a sensor data quality parameter in accordance with the embodiments described herein, and measurement of a quality parameter for data from one of multiple sensors of one embodiment of a driver assistance system over time, during operation of the vehicle.
Figure 4B:
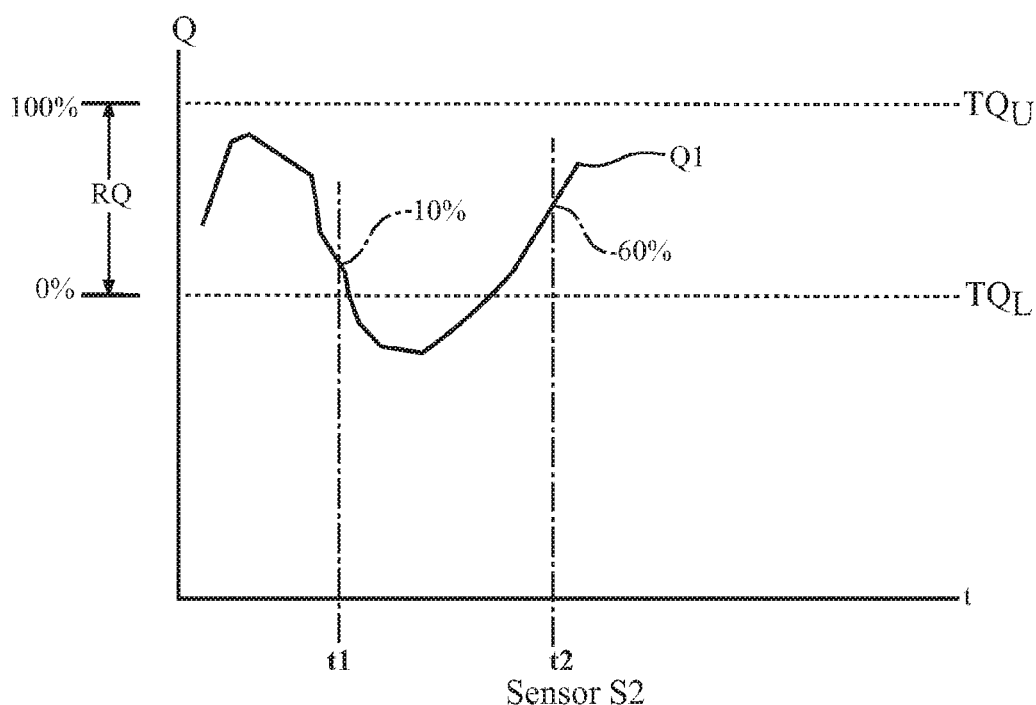
FIG. 4B is a graph demonstrating one method of calculating a reference for a sensor data quality parameter in accordance with the embodiments described herein, and measurement over time of a quality parameter for data from another one of multiple sensors of the driver assistance system embodiment represented in FIG. 4A, during operation of the vehicle.

Referring to FIGS. 4A and 4B, in another particular embodiment, multiple sensors S1 and S2 supply the data processed and used to control the autonomous system (for example, in the manner shown in system 16 of FIG. 1). The quality parameter for data from a first sensor S1 is P, and the quality parameter for data from a second sensor S2 is Q. Data from the sensors S1 and S2 may be time correlated so that data samples gathered at the same point in time are evaluated. In this case, the operational efficiency of the autonomous system may be expressed as the value of the lowest confidence level for any of the data received from the sensors S1 and S2 servicing associated the autonomous system.

Referring to FIG. 4A, threshold confidence levels for the parameter P data may be obtained as previously described for the embodiment shown in FIG. 3A. That is, when the chosen sensor quality parameter P has been analyzed and quantified for each given reference sample (i.e., the "worst-case" and "best-case" sensor readings), the parameter value for the "worst-case" scenario may be used to calculate or define a minimum or threshold confidence level $TP_L$ for the parameter P data received from the sensor. Also, the quality parameter value for the "best-case" scenario may be used to calculate or define a maximum confidence level $TP_U$ for the parameter P data received from the sensor. This enables a numerical range RP to be defined between the minimum and maximum confidence levels $TP_U$ and $TP_L$. In one embodiment, the autonomous system operational efficiency is expressed as a percentage of the numerical range RP. The minimum and maximum confidence levels $TP_U$ and $TP_L$ may be stored in a memory for reference or comparison purposes.

Similarly, referring to FIG. 4B, threshold confidence levels for the parameter Q data may be obtained as previously described for the embodiment shown in FIG. 3A. That is, when the chosen sensor quality parameter Q has been analyzed and quantified for each given reference sample (i.e., the "worst-case" and "best-case" sensor readings), the parameter value for the "worst-case" scenario may be used to calculate or define a minimum or threshold confidence level $TQ_L$ for the parameter Q data received from the sensor. Also, the quality parameter value for the "best-case" scenario may be used to calculate or define a maximum confidence level $TQ_U$ for the parameter Q data received from the sensor. This enables a numerical range RQ to be defined between the minimum and maximum confidence levels $TQ_U$ and $TQ_L$. In one embodiment, the autonomous system operational efficiency is expressed as a percentage of the numerical range RQ. The minimum and maximum confidence levels $TQ_U$ and $TQ_L$ may be stored in a memory for reference or comparison purposes.

In one example, in FIGS. 4A and 4B, at time t1, the value of quality parameter P is 50%, while the value of quality parameter Q is 10%. Thus, the lower of the quality parameter values (Q at 10%) is displayed as the operational efficiency, as shown in FIG. 4C. At a later point in time t2, the value of quality parameter P is 55%, while the value of quality parameter Q is 60%. Thus, the lower of the quality parameter values (P at 55%) is displayed as the operational efficiency, as shown in FIG. 4D.

Alternatively, the parameters P and Q may be assigned respective weights and combined to provide a composite quality parameter (not shown) which may be displayed as the system operational efficiency. For example, parameter P may be given a greater weight that parameter Q based on an assessment that parameter P is more important to the operation of the autonomous system. Alternatively, a parameter may be assigned a relatively greater weight if its calculated value is lower that the value of the other parameter. This may be due to the assumption that lower parameters values have a greater impact on the operational efficiency of the system.

FIG. 5A shows an example of a touch screen interface 510 configured to display to a user the latest estimates of operating efficiency for the various autonomous driver assistance systems. FIG. 5A shows operating efficiency estimates for a lane-keeping system and an adaptive cruise control system. However, operating efficiency and other information relating to any other autonomous driver assistance system may also be displayed in a similar manner. The screen in FIG. 5A shows the layout of the display that will usually appear during normal operation of the system.

In the example shown in FIG. 5A, the lane-keeping system operating efficiency has fallen to 24%. Display fields 501 and 502 are configured to display a reason why the operating efficiency of the associated autonomous system has fallen below a predetermined level, when the operating efficiency falls below the threshold. The efficiency percentages shown will vary as new sensor data is constantly received and processed to generate the latest quality parameter estimate, as previously described.

The computing device is also configured for comparing data samples received from sensor during vehicle operation with stored data samples embodying various types of defective data. For example, in a lane keeping system, a data sample received during operation may be compared with lower-quality data samples of the same type gathered by the same or a similar sensor. Lower-quality data samples for a lane-keeping system may include a sample showing worn or indistinct lane markers, lane markers partially covered with snow or dirt, etc. These lower-quality data samples may be correlated with associated reasons stored in memory. When a positive match is made between lower-quality operational data and a similar lower-quality stored data sample, the associated explanation text may be displayed on a screen for the user.

By displaying the reason for a relative drop in system operating efficiency, the user learns to associate changes in various external operating conditions with their associated effects on system efficiency. This educates the user as to the limitations of the associated systems and increases user familiarity with (and confidence in) the systems. As well as being displayed on the screen, the reason may be indicated to the user via audio through the HMI 109.

Fields 503 and 504 are interactive fields. When field 503 is touched by a user, the screen 570 appears on the display. This screen provides the user with selectable options relating to the operation of the lane-keeping system. In one example, the user-selectable options presented in response to touching field 503 are as shown FIG. 5B. Touching field 504 leads to a similar screen (not shown) which provides the user with selectable options relating to the operation of the adaptive cruise control. Touching either of interactive fields 505 and 507 enable a user to immediately manually deactivate the associated autonomous system.

Figure 5B:
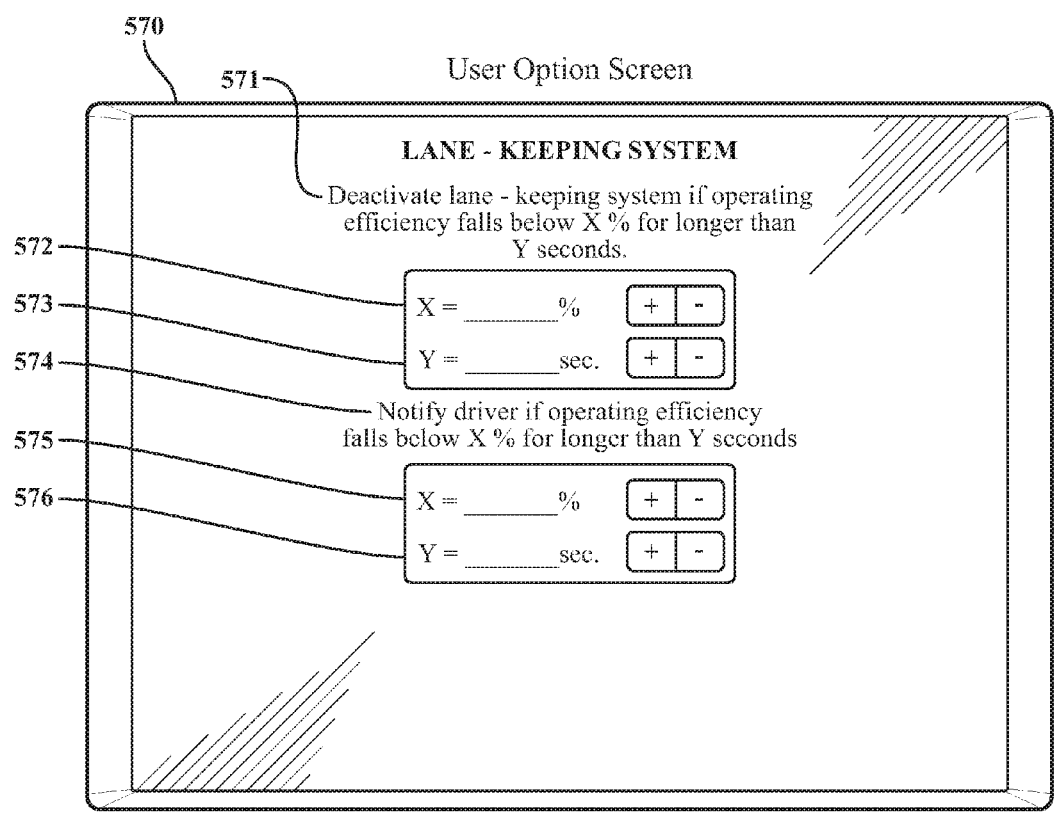
FIG. 5B shows a schematic view of an example of a touch screen interface generated by touching one of the fields shown in FIG. 5A.

Referring to FIG. 5B, the computing device 14 may also be configured to enable a user to select an efficiency percentage level below which the associated driver assistance system will be automatically deactivated. Interactive field 571 enables a user to elect automatic deactivation of the lane-keeping system if its estimated operating efficiency falls below a user-specified percentage and resides there continuously for longer than a user-specified time period. Interactive fields 572 and 573 enable the user to select the trigger percentage and time period by touching the "+" sign (to raise the associated percentage or time period) or the "−" sign (to decrement the associated percentage or time period).

Interactive field 574 enables a user to elect to receive a notification (such as the notice appearing in field 501 of FIG. 5A) if the operating efficiency falls below a user-specified percentage continuously for longer than a user-specified time period. Interactive fields 575 and 576 enable the user to select the trigger percentage and time period by touching the "+" sign (to raise the associated level) or the "−" sign (to decrement the associated level). Then, for example, if the efficiency falls below the specified percentage for longer than the specified time period, the field 501 in screen 510 will be populated.

A user may choose to operate either, both, or neither of fields 571 and 574. If the user elects not to select an efficiency percentage at which the system will deactivate, the system will automatically deactivate based on whatever other deactivation criteria are programmed into the system (for example, a malfunction of a controller, sensor, etc.). In a particular embodiment, the computing device 14 or associated system controller 14 may be configured to automatically deactivate the autonomous system without user input if the estimated data confidence level reaches 0% or falls below 0% for longer than a default predetermined time period. Alternatively, the computing device 14 may generate a notification inquiring as to whether user would like to deactivate the autonomous system.

Any notifications and/or queries to a user may be presented in visual form on the touch screen or in audio form. In addition, responses to notifications and/or queries and inputs to the control system may be in visual or audio form, using HMI 109. If a user elects percentage at which to trigger a "reason" display or an automatic driver assistance system deactivation, but does not select a predetermined time period, a default predetermined time period (for example 30 seconds) may be implemented by the control system.

Figure 6:
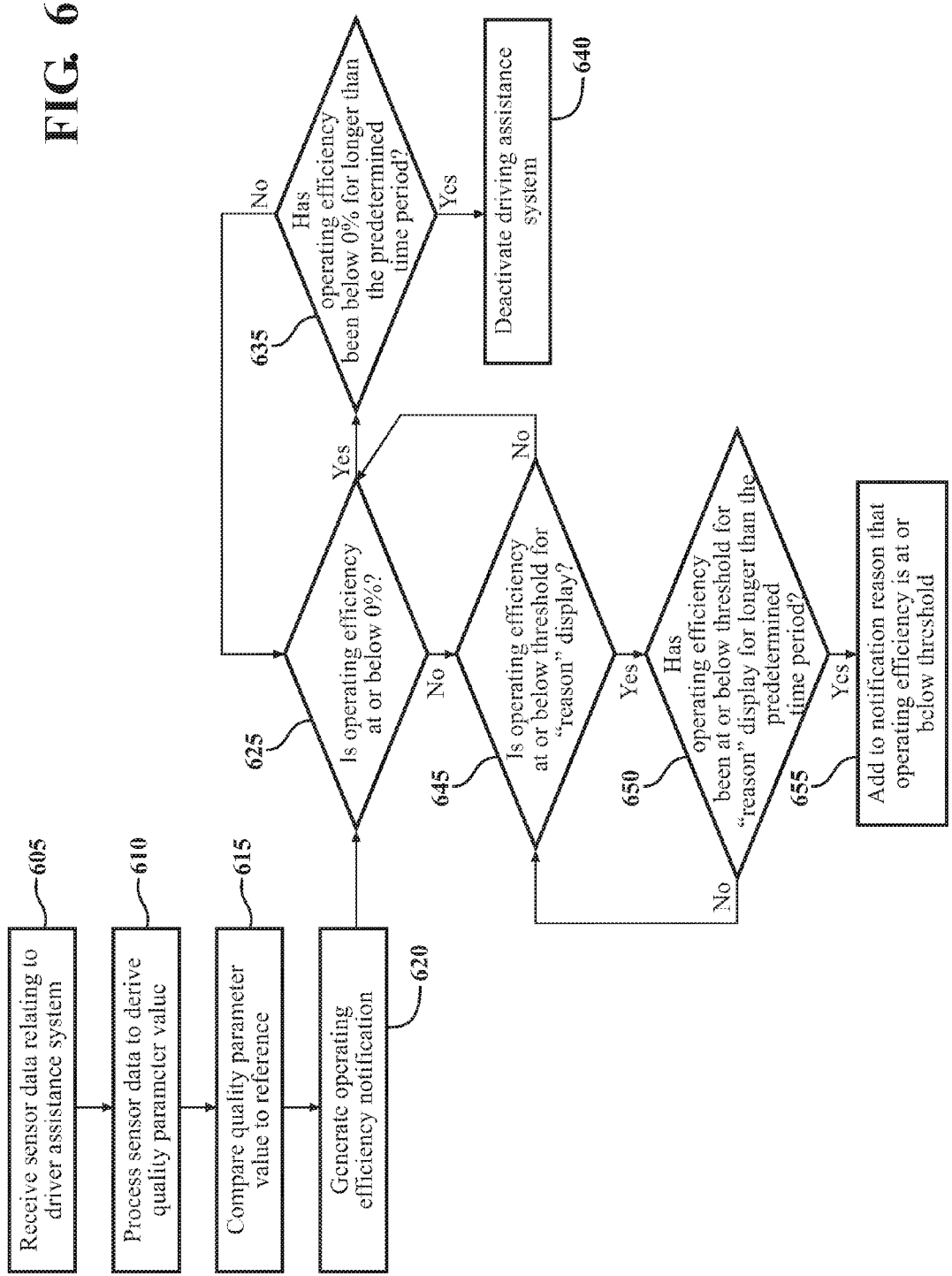
FIG. 6 is a flow diagram illustrating operation of one embodiment of a method for monitoring and displaying changes in operating efficiency of an autonomous driver assistance system.

FIG. 6 is a flow diagram illustrating operation of one embodiment of a method for monitoring and displaying changes in operating efficiency of an autonomous driver assistance system. In block 605, the computing device 14 receives data from a sensor which provides which is processed to operate the driver assistance system. For example, the sensor may be a camera in a lane-keeping system as previously described. In block 610, the computing device 14 processes the received data to derive a value of a data quality parameter determined to be representative of the operating efficiency of the driver assistance system.

In block 615, the computing device 14 compares the value of the quality parameter determined in block 610 with a reference range previously defined for the quality parameter. In block 620, the computing device 14 generates a notification which includes the current estimated operating efficiency of the driver assistance system, based on the perceived reliability of the sensor data gathered during system operation. In block 625, the computing device 14 determines if the calculated operating efficiency is at or below 0%. If the calculated operating efficiency is at or below 0%, the computing device 14 determines (in block 635) if the operating efficiency has been below 0% for longer than a predetermined time period. If the operating efficiency has been below 0% for longer than the predetermined time period, the computing device (in block 640) may determine that the driver assistance system is not operating properly, and may deactivate the driver assistance system.

If the operating efficiency has not been below 0% for longer than the predetermined time period, control transfers back to block 625, where the system operating efficiency continues to be evaluated.

Referring again to block 625, if the calculated operating efficiency is not at or below 0%, the computing device 14 determines (in block 645) if the operating efficiency is at or below a threshold at which a reason for the relatively lower operating efficiency of the system will be displayed in the notification. The threshold may be determined and entered into the computing device by a user, or the threshold may be a default threshold programmed into the device 14 in the event that a user does not select a threshold level.

If the operating efficiency is not at or below a threshold at which a reason for the relatively lower operating efficiency of the system will be displayed in the notification, control transfers back to block 625, where the system operating efficiency continues to be evaluated. If the operating efficiency is at or below a threshold at which a reason for the relatively lower operating efficiency of the system will be displayed in the notification, the computing device (in block 650) determines if the operating efficiency been at or below the threshold for "reason" display continuously for longer than a predetermined time period. The computing device may, for example, incorporate one or more internal timers which are configured to measure the time periods over which the various parameters remain at or below the threshold or trigger levels described herein. If the operating efficiency has not been at or below the threshold for "reason" display continuously for longer than the predetermined time period, control transfers back to block 650, where it is determined whether the operating efficiency is still at or below the threshold for "reason" display. If the operating efficiency has been at or below the threshold for "reason" display continuously for longer than the predetermined time period, the reason that the operating efficiency is at or below the threshold is added to the notification.

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computing device for a vehicle, the computing device comprising one or more processors for controlling operation of the computing device, and a memory for storing data and program instructions usable by the one or more processors, wherein the one or more processors are configured to execute instructions stored in the memory to:
   receive sensor data relating to operation of an autonomous driving assistance system;
   process the received sensor data to derive a value for a sensor data quality parameter;
   compare the quality parameter value to a reference; and
   generate a notification including a result of the comparison.

2. The computing device of claim 1 wherein the notification includes a current estimated operating efficiency of the autonomous driving assistance system.

3. The computing device of claim 1 wherein the one or more processors are configured to execute instructions stored in the memory to:
   receive sensor data gathered from a single sensor during operation of the autonomous system; and
   process the sensor data from the sensor to derive the value for the quality parameter.

4. The computing device of claim 1 wherein the one or more processors are configured to execute instructions stored in the memory to:
   receive sensor data from a plurality of sensors gathered during operation of the autonomous system; and
   process the sensor data from each sensor of the plurality of sensors to derive a value for a separate quality parameter for the data received from each of the sensors.

5. The computing device of claim 4 wherein the one or more processors are configured to execute instructions stored in the memory to:
   assign a weight to each quality parameter;
   combine the weighted quality parameters into a composite quality parameter; and compare the composite quality parameter value to a reference.

6. The computing device of claim 1 wherein the one or more processors are configured to execute instructions stored in the memory to deactivate the autonomous system responsive to a result of the comparison being below a predetermined value.

7. The computing device of claim 6 wherein the one or more processors are configured to execute instructions stored in the memory to enable a user to select the predetermined value.

8. The computing device of claim 1 wherein the notification further includes a reason for the result of the comparison.

9. The computing device of claim 8 wherein the one or more processors are configured to execute instructions stored in the memory to enable a user to select a threshold operating efficiency at or below which the reason for the result of the comparison will be included in the notification.

10. The computing device of claim 1 wherein the autonomous driving assistance system is an autonomous lane-keeping system.

11. The computing device of claim 1 wherein the autonomous driving assistance system is an adaptive cruise control system.

12. A vehicle including a computing device in accordance with claim 1.

13. A vehicle control system including a computing device in accordance with claim 1.

14. The computing device of claim 1 wherein the one or more processors are configured to execute instructions stored in the memory to enable manual deactivation of the autonomous system.

15. The computing device of claim 1 wherein the one or more processors are configured to execute instructions stored in the memory to enable a user to elect implementation of automatic deactivation of the autonomous system responsive to the occurrence of an operating efficiency at or below a predetermined threshold.

16. The computing device of claim 15 wherein the one or more processors are configured to execute instructions stored in the memory to enable a user to select the predetermined threshold at which automatic deactivation of the autonomous system will occur.

17. The computing device of claim 1 wherein the one or more processors are configured to execute instructions stored in the memory to automatically deactivate the autonomous system responsive to the occurrence of an operating efficiency at or below a predetermined threshold.

18. A computing device for a vehicle, the computing device comprising one or more processors for controlling operation of the computing device, and a memory for storing data and program instructions usable by the one or more processors, wherein the one or more processors are configured to execute instructions stored in the memory to:

receive sensor data relating to operation of the autonomous driving assistance system;
process the received sensor data to derive a value for a data quality parameter;
compare the quality parameter value to a reference;
responsive to the comparison of the quality parameter value to the reference, determine if an operating efficiency of the autonomous driving assistance system is below a first predetermined value;
responsive to a determination that the operating efficiency of the autonomous driving assistance system is below the first predetermined value, determine if the operating efficiency of the autonomous driving assistance system has been below the first predetermined value for longer than a predetermined time period; and
responsive to a determination that the operating efficiency of the autonomous driving assistance system has been below the first predetermined value for longer than the predetermined time period, control the vehicle so as to deactivate the autonomous driving assistance system.

19. The computing device of claim 18 wherein the one or more processors are configured to execute instructions stored in the memory to:

responsive to a determination that the operating efficiency of the autonomous driving assistance system is not below a first predetermined value, determine if the operating efficiency of the autonomous driving assistance system is at or below a second predetermined value greater than the first predetermined value;
responsive to a determination that the operating efficiency of the autonomous driving assistance system is at or below the second predetermined value, determine if the operating efficiency of the autonomous driving assistance system has been at or below the second predetermined value for longer than a predetermined time period; and
responsive to a determination that the operating efficiency of the autonomous driving assistance system has been at or below the second predetermined value for longer than the predetermined time period, generate a notification including a reason that the operating efficiency of the autonomous driving assistance system is at or below the second predetermined value.

20. The computing device of claim 18 wherein the one or more processors are configured to execute instructions stored in the memory to:

process the sensor data from each sensor of the plurality of sensors to derive a value for a separate quality parameter for the data received from each of the sensors;
assign a weight to each quality parameter to provide weighted quality parameters; and
combine the weighted quality parameters into a composite quality parameter.

* * * * *